United States Patent [19]
MacDonald

[11] 3,878,447
[45] Apr. 15, 1975

[54] DYNAMIC BRAKE LIMITING SYSTEM

[75] Inventor: Norman L. MacDonald, Chicago, Ill.

[73] Assignee: General Motors Corporation, Detroit, Mich.

[22] Filed: Nov. 7, 1973

[21] Appl. No.: 413,600

[52] U.S. Cl. .............................. 318/375; 318/381
[51] Int. Cl. ............................................. H02p 3/12
[58] Field of Search .................... 318/365–367, 318/375, 376, 379–381

[56] References Cited
UNITED STATES PATENTS

| | | | |
|---|---|---|---|
| 2,627,597 | 2/1953 | Johansson | 318/365 |
| 2,751,537 | 6/1956 | Seward | 318/367 X |
| 3,569,811 | 3/1971 | Miller et al. | 318/381 |
| 3,651,388 | 3/1972 | Machin, Jr. et al. | 318/375 X |

Primary Examiner—Robert K. Schaefer
Assistant Examiner—W. E. Duncanson, Jr.
Attorney, Agent, or Firm—Howard N. Conkey

[57] ABSTRACT

A system for limiting the braking effort of diesel electric locomotive traction motors used to dynamically brake the locomotive. The system includes braking grid current limitation and further includes a circuit which generates a signal related to the magnitude of the traction motor field current and a signal related to the braked grid resistance current. These signals are summed and when the sum exceeds a specified value, a signal is generated for effecting the decrease in the traction motor field current to limit the dynamic braking effort.

3 Claims, 5 Drawing Figures 3,878,447

DYNAMIC BRAKE LIMITING SYSTEM

This invention relates to dynamic braking systems and particularly to a dynamic braking motor for use in conjunction with diesel electric locomotives.

In diesel electric locomotives, the traction motors which are used to propel a locomotive on the rails may also be used to dynamically brake the locomotive. To dynamically brake the locomotive, the armatures of the traction motors are connected across dynamic braking grid resistors and the fields thereof are excited by the output of a main generator. When the locomotive is moving to drive the traction motor armatures, the traction motors operate as electrical generators with the power generated thereby being dissipated in the grid resistors.

Known braking systems include controls for maintaining the traction motor field current constant until the grid resistor current reaches a maximum allowable magnitude after which the field current is controlled to limit the grid resistor current at the maximum allowable level. At the time when the grid resistance current reaches the maximum level, the traction motor field current is at its maximum and maximum braking effort is achieved. Due to increasing numbers of traction motors being used on diesel electric locomotives, the peak braking effort achieved, when the grid resistance current and the field current is at the maximum, may exceed an allowable safe braking effort. Accordingly, it is the general object of this invention to provide a dynamic braking effort limiting system for limiting the braking effort of traction motors as a function of both the current through the traction motor field windings and the dynamic braking grid resistance.

It is another object of this invention to provide a dynamic braking effort limiter for limiting the braking effort of traction motors by controlling the current through the traction motor field windings as a function of the sum of the traction motor field current and the dynamic braking grid resistance current.

It is yet another object of this invention to provide a dynamic braking effort limiter for limiting the braking effort of traction motors which limits the braking grid resistor current and which limits the sum of the braking grid resistor current and the traction motor field current.

These and other objects of this invention may be best understood by references to the following description of a preferred embodiment and the drawings in which.

Figure 4:
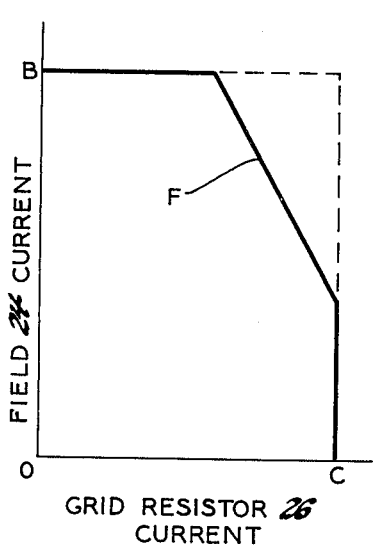
Figure 5:
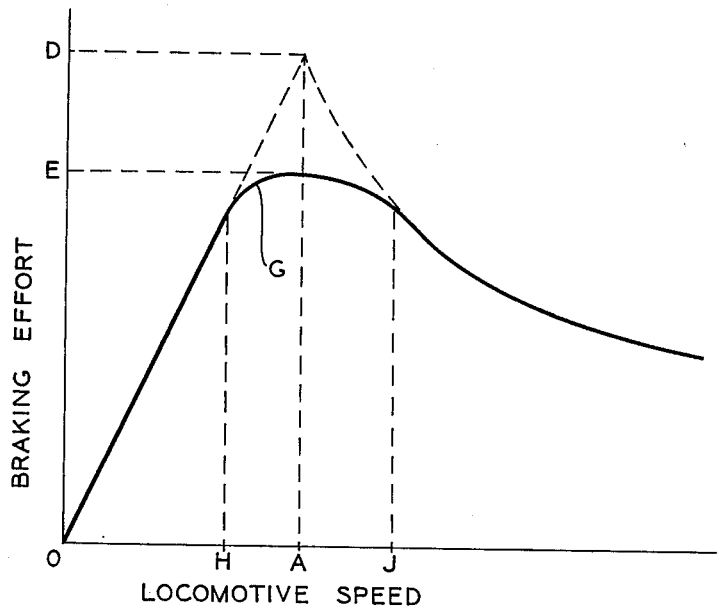

FIG. 4 is a plot of traction motor field current versus braking grid resistance current as controlled in accordance with the principles of this invention, and as controlled in accordance with conventional dynamic braking controls; and FIG. 5 is a plot of the locomotive braking effort versus locomotive speed as controlled in accordance with the principles of this invention and as controlled in accordance with conventional dynamic braking controls.

Figure 1:
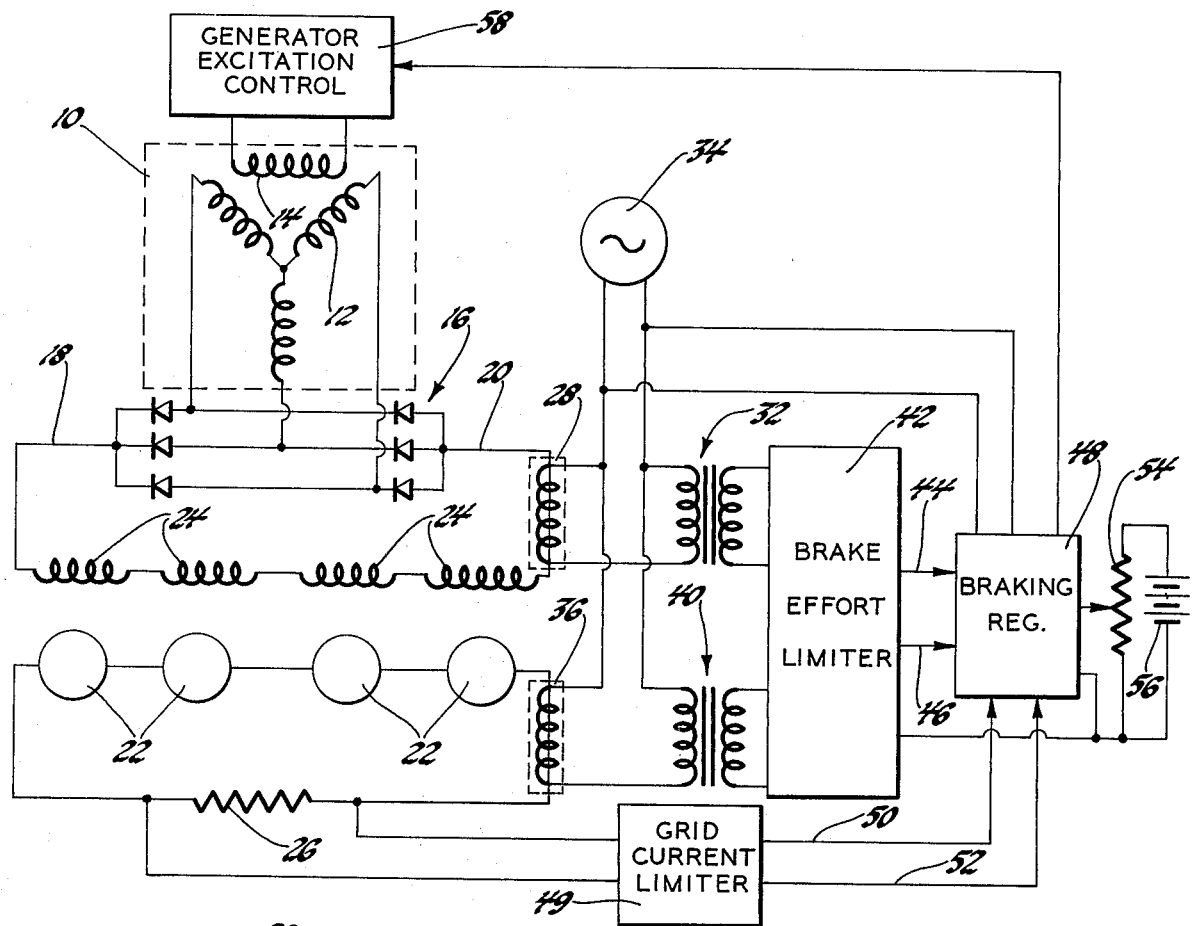
FIG. 1 is a schematic diagram of a locomotive dynamic braking control system made in accordance with the principles of this invention.

Referring to the drawings and particularly to FIG. 1, the reference numeral 10 designates a main power supply generator for the traction motors of a locomotive. The generator 10 is an alternating current generator having a three phase Y connected stator winding 12 and a field winding 14 which may be mounted on the rotor of the generator 10. The rotor is driven by an engine which is not illustrated. The output voltage of the stator winding 12 is applied to a three phase full wave bridge rectifier designated by reference numeral 16 and having direct current output terminals connected with power supply conductors 18 and 20.

The locomotive includes a plurality of traction motors having respective armatures 22 which are operably connected to the wheels of the locomotive in a conventional manner which is not illustrated. Each traction motor also has a respective field winding 24. As seen in FIG. 1, the traction motor armatures 22 and field windings 24 are coupled in a dynamic braking configuration wherein the field windings 24 are series coupled across the power supply conductors 18 and 20 and the armatures 22 are series or parallel coupled with a dynamic braking grid resistor 26. The resistor 26 may in fact be a plurality of resistors whose total resistance is represented by the single resistor 26.

The armatures 22, being coupled to the locomotive wheels, rotate whenever the locomotive is moving. During dynamic braking, the traction motors become electrical generators and supply current through the dynamic braking grid resistance 26 when the armatures are rotated. The magnitude of the current through the dynamic braking grid resistance 26 is determined by the speed at which the armatures rotate and by the amount of excitation current in the field windings 24. With a given field winding excitation current, the braking effort of the locomotive increases as a function of the armature speed and consequently the locomotive speed. In addition, for a given speed of the armatures 22, the locomotive braking effort is approximately proportional to the current through the field windings 24. The desired locomotive dynamic braking characteristics are obtained by controlling the excitation of the field winding 14 of the generator 10 and consequently the current through the field windings 24 in response to the current through the field windings 24 and the grid resistor 26.

A transductor 28 monitors the current through the field windings 24 and is series coupled with the primary winding of a transformer 32 across the output of an auxiliary alternator 34. A transductor 36 monitors the current through the grid resistor 26 and is series coupled with the primary winding of a transformer 40 across the output of the alternator 34. The output of the transformer 32 across the secondary winding thereof is a signal having a magnitude directly proportional to the current through the field windings 24 which signal is coupled to a brake effort limiter 42. The output of the transformer 40 across the secondary winding thereof is a signal having a magnitude directly proportional to the current through the grid resistor 26, which signal is coupled to the brake effort limiter 42. The brake effort limiter 42 provides an output on a pair of conductors 44 and 46 which is determined by the sum of the respective currents through the field windings 24 and the grid resistance 26. The output conductors 44 and 46 are coupled to a braking regulator 48.

The voltage generated across the dynamic braking grid resistor 26 when the armatures 22 are rotated is coupled to a grid current limiter 49 which supplies an output on conductors 50 and 52 which is determined by the magnitude of the current through the grid resistor 26. The conductors 50 and 52 are coupled to the braking regulator 48.

A potentiometer 54 is coupled across a DC battery 56 and includes a wiper arm positionable by the locomotive operator to generate a signal representing a braking demand. This signal is comprised of the voltage between the wiper arm and the negative terminal of the battery 56 and is coupled to braking regulator 48. In addition, the negative terminal of the battery 56 is coupled to the brake effort limiter 42. The braking regulator 48 also receives an input from the auxiliary alternator 34.

The output of the braking regulator 48 is coupled to a generator excitation control circuit 58 which is responsive thereto to control the excitation current through the field winding 14 of the generator 10. The signal supplied to the generator excitation control circuit 58 by the braking regulator 48 is such that the current through the field windings 24 are controlled so as to produce the desired dynamic braking characteristics.

The grid current limiter 49, the potentiometer 54, the braking regulator 48 and the generator excitation control circuit 58 cooperate to control the excitation of the field winding 14 of the generator 10 to control the excitation of the field windings 24 as in conventional systems to obtain the characteristics illustrated by the dashed line portion of the curves in FIGS. 4 and 5 and as hereinafter described. Referring to those FIGURES, at locomotive speeds between O and A, the aforementioned conventional system maintains the current through the field windings 24 at a constant magnitude B determined by the braking demand as represented by the signal output from the potentiometer 54. At speed A, the current through the grid resistance 26 has a magnitude C which is the maximum allowable current therethrough. At this speed, the braking effort is at a maximum level D which, with maximum braking demand, may exceed allowable safe limits. At locomotive speeds greater than A, the current through the field winding 24 is regulated to limit the current through the grid resistor 26 at the maximum level C.

The subject brake limiter incorporates into the abovedescribed conventional system the brake effort limiter 42 which cooperates with the braking regulator 48 and the generator excitation control circuit 58 to limit the braking effort to a safe braking level E below the peak level D. This is accomplished by limiting the sum $K_1 I_1 + K_2 I_2$ to a specified maximum level, whereby $K_1$ and $K_2$ are constants and $I_1$ and $I_2$ are the magnitudes, respectively, of the current through the field windings 24 and the current through the grid resistance 26. When the locomotive is between the speeds H and J wherein the sum $K_1 I_1 + K_2 I_2$ would normally exceed the specified maximum level, the current through the field windings 24 is regulated to maintain the sum at the specified maximum level resulting in the braking characteristics represented by the segments F and G in the curves of FIGS. 4 and 5. At locomotive speeds less than H and greater than J, control is as in the conventional system described.

Figure 2:
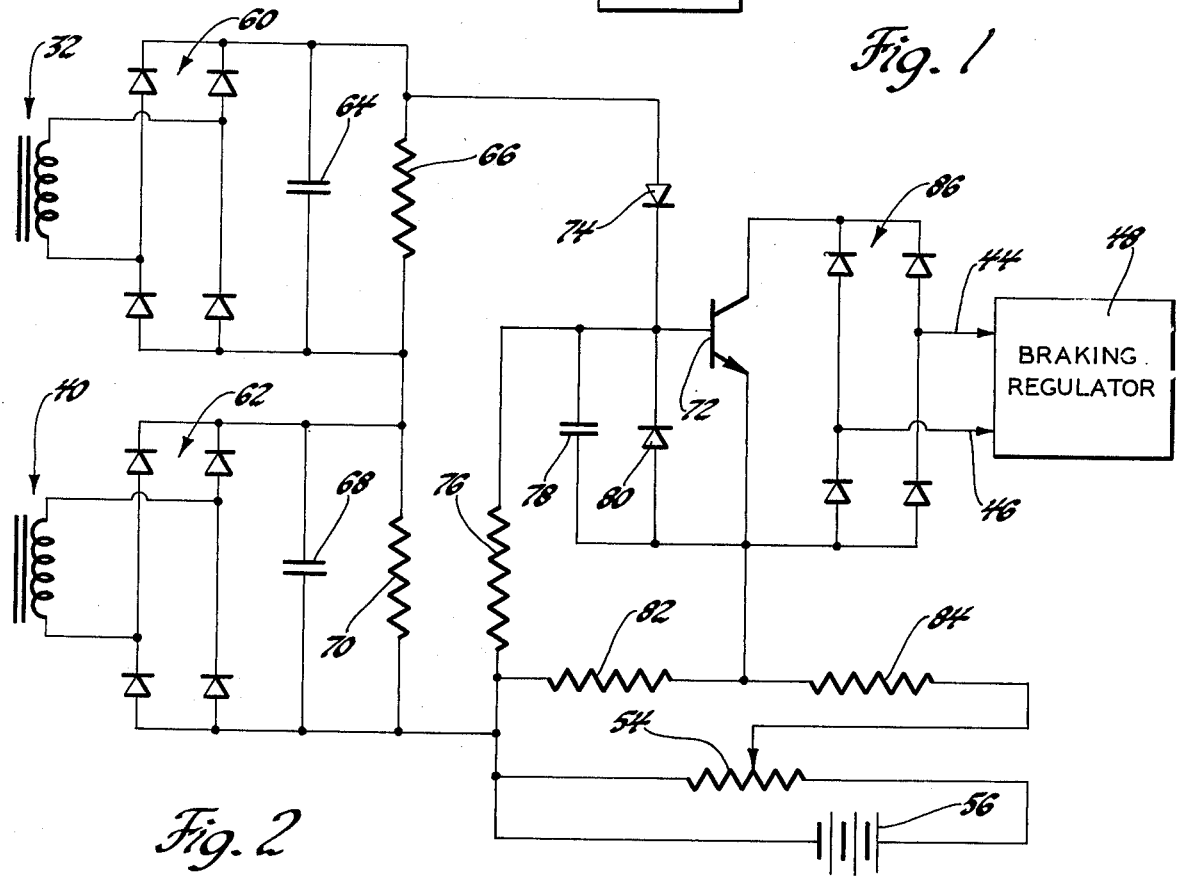
FIG. 2 is a circuit diagram of the brake effort limiter of FIG. 1.

Referring to FIG. 2, the brake effort limiter 42 includes a full wave bridge rectifier designated by reference numeral 60 and a full wave bridge rectifier designated by the reference numeral 62. The output from across the secondary winding of the transformer 32 is coupled across the input of the bridge rectifier 60 whose output is coupled across a filtering capacitor 64 and a resistor 66. The output from across the secondary winding of the transformer 40 is coupled across the input of the bridge rectifier 62 whose output is coupled across a filtering capacitor 68 and a resistor 70.

The resistors 66 and 70 are series coupled with one side of said series circuit being coupled to the negative terminal of the locomotive battery 56 and the other side coupled to the base electrode of an NPN transistor 72 through a diode 74. A resistor 76 is coupled between the base electrode of the transistor 72 and the negative terminal of the DC battery 56. A filtering capacitor 78 and a diode 80 are coupled between the base and the emitter electrodes of the transistor 72.

The voltage across the series circuit comprised of the resistors 66 and 70 represents the sum $K_1 I_1 + K_2 I_2$ previously described. This voltage is applied to the base electrode of the transistor 72.

The emitter electrode of the transistor 72 is coupled between a pair of series coupled resistors 82 and 84 which are coupled between the wiper arm of the potentiometer 54 and the negative terminal of the DC battery 56. The reference potential applied to the emitter electrode of the transistor 72 from between the resistors 82 and 84 is direct function of the braking demand established by the positioning of the wiper arm of the potentiometer 54 by the locomotive operator. This emitter bias potential establishes the maximum allowable magnitude of the sum $K_1 I_1 + K_2 I_2$ for a given braking demand. When the sum $K_1 I_1 + K_2 I_2$ as represented by the voltage across the resistors 66 and 70 exceeds the maximum allowable sum represented by the bias on the emitter electrode of the transistor 72, the transistor 72 is biased into conduction. When the sum $K_1 I_1 + K_2 I_2$ is less than the maximum allowable sum, the transistor 72 is biased into nonconduction.

The emitter and collector electrodes of the transistor 72 is coupled across a full wave bridge rectifier designated by reference numeral 86. The output of the bridge rectifier 86 is coupled by the conductors 44 and 46 to the braking regulator 48. As can be seen, when the transistor 72 is biased into conduction the conductors 44 and 46 are shorted and when the transistor 72 is biased into nonconduction, the conductors 44 and 46 are open circuited.

Figure 3:
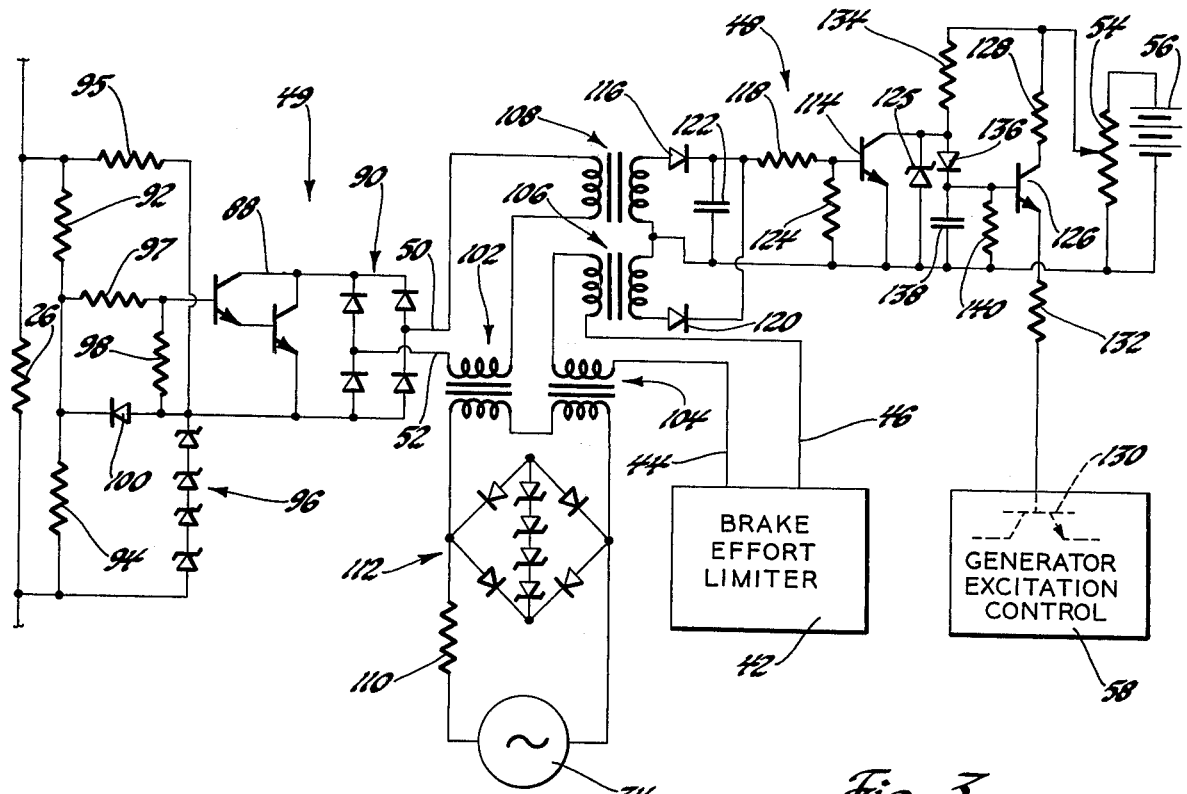
FIG. 3 is a circuit diagram of the braking regulator of FIG. 1.

Referring to FIG. 3, the grid current limiter 49 includes a Darlington amplifier 88 whose output is coupled across the input of a full wave bridge rectifier designated by reference numeral 90. The voltage across the grid resistor 26 is coupled across a voltage divider comprised of a resistor 92 and a resistor 94 and across a series circuit comprised of a resistor 95 and a voltage reference generator generally designated 96 comprised of a plurality of Zener diodes. The junction between the resistor 92 and 94 is coupled to the base electrode of the Darlington amplifier 88 through a resistor 97. A resistor 98 is coupled between the base and the emitter electrodes of the Darlington amplifier 88. The positive side of the voltage reference 96 is coupled to the emitter electrode of the Darlington amplifier 88 and to the junction between the resistors 92 and 94 through a diode 100. The voltage generator 96 establishes an emitter reference potential for the Darlington amplifier 88 which is equal to the voltage across the grid resistors that represents a current therethrough equal to the maximum allowable value C as previously described and illustrated in FIG. 4. When the current through the grid resistor 26 exceeds the maximum allowable limit C, the voltage applied to the base electrode of the Darlington amplifier 88 through the resistor 97 exceeds the reference potential and the Darlington amplifier 88 is biased into conduction to short the conductors 50 and 52 coupled to the output of the bridge rectifier 90. When the current through grid resistor 26 is less than the maximum allowable limit C, the Darlington amplifier 88 is biased into nonconduction to open circuit the output conductors 50 and 52.

The braking regulator 48 includes a plurality of transformers 102, 104, 106 and 108. The primary windings of the transformers 102 and 104 are series coupled across the output of the alternator 34 which excites the primary windings through a current limiting resistor 110. A voltage regulator designated by reference numeral 112 is coupled across the series coupled primary windings of the transformers 102 and 104. The secondary winding of the transformer 102 and the primary winding of the transformer 108 are series coupled across the conductors 50 and 52. The secondary winding of the transformer 104 and the primary winding of the transformer 106 are series coupled across the conductors 44 and 46. The secondary windings of the transformers 106 and 108 are series coupled, one side of said series coupled circuit being coupled to the base electrode of an NPN transistor 114 through a diode 116 and a resistor 118 and the other side thereof being coupled to the base electrode of the transistor 114 through a diode 120 and the resistor 118. A filtering capacitor 122 is coupled between the cathode of the diode 116 and the negative terminal of the DC battery 56. The junction between the secondary windings of the transformers 106 and 108 is also coupled to the negative terminal of the DC battery 56. A resistor 124 is coupled between the base and emitter electrodes of the transistor 114 and a Zener diode 125 is coupled between the collector and emitter electrodes thereof.

An NPN transistor 126 has its collector electrode coupled to the wiper arm of the potentiometer 54 through a resistor 128 and its emitter electrode coupled to a control transistor 130 in the generator excitation control circuit 58 through a resistor 132. The wiper arm of the potentiometer 54 is coupled to the base electrode of the transistor 126 through a resistor 134 and a diode 136. The base electrode of the transistor 126 is coupled to the negative terminal of the DC battery 56 through the parallel combination of a capacitor 138 and a resistor 140.

The generator excitation control circuit 58 is conventional and may take the form of the apparatus for controlling the excitation of the field winding of the main generator disclosed in the GP40-2 Locomotive Service Manual published by Electro-Motive Division of General Motors Corporation, La Grange Ill., the transistor 130 in FIG. 3 functioning as the transistor Q, in the SB module described in Section 7 of this manual. Decreased conduction of the transistor 130 is effective for decreasing the excitation of the field windings 24 and conversely, increased conduction of the transistor 130 is effective for increasing the excitation of the field windings 24.

Referring to the FIGURES and assuming the locomotive increasing in speed from a standstill, the capacitor 138 in the braking regulator is charged through the resistor 134 and the diode 136 from the potentiometer 54 to bias the transistor 126 into conduction. A signal is applied to the base electrode of the transistor 130 in the generator excitation control circuit 58 which controls the excitation of the field coil 14 of the generator 10. Consequently current having the magnitude I3 flows through the field windings 24 of the traction motors. At low speeds, as previously described, the sum $K_1 I_1 + K_2 I_2$ is less than the maximum allowable magnitude. Therefore the transistor 72 is nonconducting and the conductors 44 and 46 are open circuited. In addition, the magnitude of the current through the dynamic braking grid resistor 26 is less than the maximum allowable magnitude C. Therefore, the Darlington amplifier 88 is nonconducting and the conductors 50 and 52 are open circuited. Consequently no current can flow through the primary windings of the transformers 106 and 108 and the capacitor 122 is discharged to bias the transistor 114 into nonconduction. Therefore, the excitation of the field windings 24 is controlled solely by operation of the potentiometer 54 by the locomotive operator.

Assuming the locomotive speed increasing toward the speed H in FIG. 5, the current through the grid resistor 26 increases until at the speed H, the sum $K_1 I_1 + K_2 I_2$ exceeds the maximum value to bias the transistor 72 into conduction as previously described to short circuit the conductors 44 and 46 to provide a current path for the primary winding of the transformer 106 and the secondary winding of the transformer 104. The voltage induced in the secondary winding of the transformer 104 causes a current to flow through the primary winding of the transformer 106 which in turn induces a voltage across the secondary winding thereof. The voltage induced into the secondary winding of the transformer 106 is rectified and charges the capacitor 122 to a level to bias the transistor 114 into conduction. Conduction of the transistor 114 couples the anode of the diode 136 to the negative terminal of the DC battery 56. The capacitor 138 thereafter discharges through the resistor 140 at a controlled rate to decrease the conduction of the transistor 126. The generator excitation control circuit 58 is responsive thereto for decreasing the excitation of the field windings 14 and consequently the field windings 24 until the sum $K_1 I_1 + K_2 I_2$ decreases to bias the transistor 72 into nonconduction to open circuit the conductors 44 and 46. Thereafter, the capacitor 122 discharges to bias the transistor 114 into nonconduction and the capacitor 138 again charges to bias the transistor into conduction to effect the increase in current through the field windings 24. This cycle is continually repeated to regulate the excitation current in the field windings 24 so as to conform with the segment F of the curve of FIG. 4 to regulate the dynamic braking as represented by the segment G of the curve of FIG. 5. Assuming the locomotive speed increases to H, the current through the grid resistor 26 reaches the maximum allowable current. Thereafter, the grid current limiter 49 is effective for controlling the conduction of the transistor 114 and consequently the transistor 126 in the same manner as the brake effort limiter 42 to maintain the excitation current in the field windings 24 to a value to limit the current through the grid resistor 26 to the maximum value.

As can be seen, by selecting the transductors 28 and 36 and the resistors 66 and 70, the values of $K_1$ and $K_2$ can be chosen so as to obtain the desired slope of the segment F in the curve of FIG. 4 and the desired braking characteristics represented by the segment G in the curve of FIG. 5. Also, $K_1$ and $K_2$ may be equal and may have a value of unity.

The detailed description of the preferred embodiment of the invention for the purpose of explaining the principles is not to be considered as limiting or restricting the invention, since many modifications may be made by the excercise of skill in the art without departing from the scope of the invention.

What is claimed is:

1. A dynamic brake control system comprising: at least one electrical machine including a variably driven armature and a field winding; a dynamic braking grid resistance connected across the armature; energizing means for variably energizing the field winding; a first current sensor responsive to current through the field winding for generating a first signal having a magnitude defined by the expression $K_1 I_1$ where $K_1$ is a constant and $I_1$ is the magnitude of the current through the field winding; a second current sensor responsive to current through the dynamic braking grid resistance for generating a second signal having a magnitude $K_2 I_2$ where $K_2$ is a constant and $I_2$ is the magnitude of the current through the dynamic braking grid resistance; means connected to the first and second current sensors for generating a limit signal when the magnitude of the sum $K_1 I_1 + K_2 I_2$ is equal to a specified value; and regulating means coupled between the last mentioned means and the energizing means for controlling the energizing means in response to the limit signal to limit the magnitude of the sum $K_1 I_1 + K_2 I_2$ to the specified value to thereby limit the braking effort of the electrical machine.

2. A locomotive dynamic brake system comprising: at least one locomotive traction motor operating as a generator and having a field winding and an armature driven by the wheels of the locomotive; a dynamic braking grid resistance connected across the armature; energizing means for variably energizing the field winding; manually operable means for controlling the energizing means to establish a pre-selected magnitude of current through the field winding representing a locomotive braking demand; a first current sensor for generating a first signal having a magnitude related to the magnitude of current through the field winding; a second current sensor for generating a second signal having a magnitude related to the magnitude of current through the dynamic braking grid resistance; means connected to the first and second current sensors for generating a first limit signal when the magnitude of the sum of the first and second signals is equal to a specified maximum sum; means responsive to the magnitude of current through the dynamic braking grid resistance for generating a second limit signal when the magnitude of said current exceeds a specified maximum grid current; and regulating means coupled to the energizing means for overriding the manually operable means in response to the first limit signal to control the energizing means so as to limit the magnitude of the sum of the first and second signals at the specified maximum sum and overriding the manually operable means in response to the second limit signal so as to limit the magnitude of the current through the dynamic braking grid resistance at the specified maximum grid current to thereby control the braking effort of the locomotive traction motor.

3. A locomotive dynamic brake system comprising: at least one locomotive traction motor operating as a generator and having a field winding and an armature driven by the wheels of the locomotive; a dynamic braking grid resistance connected across the armature; energizing means for variably energizing the field winding; manually operable means for controlling the energizing means to establish a pre-selected magnitude of current through the field winding representing a locomotive braking demand; a first current sensor for generating a first signal having a magnitude related to the magnitude $I_1$ of current through the field winding; a second current sensor for generating a signal having a magnitude related to the magnitude $I_2$ of current through the dynamic braking grid resistance; summing means coupled to the first and second current sensors for generating a control voltage having a magnitude equal to the sum $K_1 I_1 + K_2 I_2$, where $K_1$ and $K_2$ are constants; means coupled to the manually operable means for generating a reference voltage having a magnitude related to the locomotive braking demand, the magnitude of the reference voltage representing a specified maximum magnitude of the sum $K_1 I_1 + K_2 I_2$; an NPN transistor; means for coupling the control voltage to the base electrode of the transistor; means for coupling the reference voltage to the emitter electrode of the transistor, the transistor being biased into conduction when the magnitude of the control voltage exceeds the magnitude of the reference voltage to generate a first limit signal; grid current limiting means responsive to the magnitude of current through the dynamic braking grid resistance for generating a second limit signal when the magnitude of said current exceeds a specified maximum grid current; and regulating means coupled to the energizing means, the transistor and the grid current limiting means for overriding the manually operable means in response to the first limit signal to control the energizing means so as to limit the magnitude of the sum $K_1 I_1 + K_2 I_2$ at the specified maximum sum and overriding the manually operable means in response to the second limit signal so as to limit the magnitude of the current through the dynamic braking grid resistance at the specified maximum grid current to thereby control the braking effort of the locomotive traction motor.

* * * * *